US008225498B2

(12) United States Patent
Lin

(10) Patent No.: US 8,225,498 B2
(45) Date of Patent: Jul. 24, 2012

(54) SYSTEM AND METHOD FOR RECONFIGURING A HARNESS BOARD

(75) Inventor: Xiao Lin, Indianapolis, IN (US)

(73) Assignee: Siemens Industry, Inc., Alpharetta, GA (US)

( * ) Notice: Subject to any disclaimer, the term of this patent is extended or adjusted under 35 U.S.C. 154(b) by 274 days.

(21) Appl. No.: 12/110,782

(22) Filed: Apr. 28, 2008

(65) Prior Publication Data

US 2008/0264513 A1 Oct. 30, 2008

Related U.S. Application Data

(60) Provisional application No. 60/914,071, filed on Apr. 26, 2007.

(51) Int. Cl.
*B23P 19/00* (2006.01)
*H01R 43/20* (2006.01)
*H01R 43/00* (2006.01)

(52) U.S. Cl. ................ 29/745; 29/747; 29/748; 29/749; 29/755

(58) Field of Classification Search .................... 29/832, 29/850, 745, 747, 748, 749, 755; 140/92.1, 140/93 R
See application file for complete search history.

(56) References Cited

U.S. PATENT DOCUMENTS 3,946,768 A * 3/1976 Fiorentino .................. 140/92.1
4,092,019 A * 5/1978 Young .......................... 269/296
4,292,834 A * 10/1981 Tishler et al. ................ 72/481.3
4,305,114 A * 12/1981 Takagi et al. ................. 361/614
4,323,227 A * 4/1982 Turek ........................ 269/254 R
4,705,960 A * 11/1987 Lovrenich ..................... 307/149
4,711,025 A * 12/1987 DeSanto ......................... 29/854
4,859,953 A * 8/1989 Young et al. .................. 324/539
4,979,544 A * 12/1990 Swindlehurst ............... 140/92.1
5,072,185 A * 12/1991 Rockwell ...................... 324/539
5,082,253 A * 1/1992 Suzuki et al. ................... 269/45
5,109,597 A * 5/1992 Elder et al. ...................... 29/721
5,168,904 A * 12/1992 Quinkert ...................... 140/92.1
5,490,664 A * 2/1996 Justus et al. .................... 269/66
5,575,274 A * 11/1996 DePalma ...................... 126/512
5,598,627 A * 2/1997 Saka et al. ....................... 29/861
5,654,871 A * 8/1997 Wentler et al. ................ 361/622
5,665,405 A * 9/1997 Hettinga ....................... 425/589
5,694,678 A * 12/1997 Karasik ........................... 29/721
5,832,602 A * 11/1998 Uezono et al. .................. 29/850
5,878,788 A * 3/1999 Gurry .......................... 140/92.1
5,932,846 A * 8/1999 Zaguskin et al. ........... 174/70 R
6,086,037 A * 7/2000 Nagy et al. ...................... 249/91
6,126,228 A * 10/2000 Davis et al. ................ 296/146.7
6,255,828 B1 * 7/2001 Rockwell et al. ............. 324/539
6,612,021 B1 * 9/2003 Taniguchi et al. .............. 29/748
6,715,513 B2 * 4/2004 Landolt et al. ............... 140/92.1
6,946,604 B1 * 9/2005 Maris .......................... 174/72 A
2003/0107293 A1 * 6/2003 Frey et al. ..................... 310/239
2003/0221743 A1 * 12/2003 Landolt et al. ............... 140/92.1
2006/0030951 A1 * 2/2006 Davlin et al. ..................... 700/3
2006/0228932 A1 * 10/2006 Komiyama ................... 439/467

* cited by examiner

*Primary Examiner* — David Angwin

(57) ABSTRACT

A reconfigurable harness board system is provided for assembling a wire harness for an electrical panel and comprises a plurality of sub-harness modules. Each sub-harness module defines a swappable template for a wire harness for a respective electrical component for the electrical panel. Select ones of the sub-harness modules are mounted to a frame according to a first layout of electrical components for the electrical panel to create a reconfigurable harness board system in which each sub-harness module is detachable from the frame to be swapped with a different sub-harness module in order to reconfigure the harness board system according to a second layout of electrical components.

6 Claims, 4 Drawing Sheets

SYSTEM AND METHOD FOR RECONFIGURING A HARNESS BOARD

CROSS REFERENCE TO RELATED APPLICATIONS

This application claims priority of provisional application No. 60/914,071 filed on Apr. 26, 2007.

FIELD OF THE INVENTION

This application relates to manufacture of wire harnesses and, more particularly, to a system and method for reconfiguring a harness board.

BACKGROUND OF THE INVENTION

Electrical control systems, such as motor control center (MCC) units include individual control components, such as starters, circuit breakers, etc. Such MCC units, or the like, are typically provided with the control components pre-wired. Pre-wiring is facilitated by creating a wire harness with a plurality of individual wires pre-cut, terminated, bent, positioned, and held together with wire ties. The wire harness can then be positioned in the MCC unit and the wires terminated as necessary. This saves time in assembling the MCC unit, increasing productivity.

Challenges in conventional wire harness systems and methods include expensive labor costs and low productivity. Different MCC units have different wire harnesses. It may take an operator a long time to determine the appropriate way to route the wire. Typically, the operator is not provided any guidance to transfer the schematic drawing to harness routing. A skilled worker is required in order to digest the schematic and build the wire harness, which increases labor costs.

Conventional wire harnesses may not be precise. Although a standard harness board may be used to help the operator, one harness board cannot cover all the different wire harnesses of all the MCC units. Additional labor is required at wiring stage to re-cut and re-strip an imprecise harness. The above can result in increasing the likelihood of mistakes and wiring the wrong connection.

Current MCC units can be dynamically configured according to the units' functionality. While the MCC unit may contain only about 10 components, the combination of different components can create hundreds of layouts. It is difficult to make a precise harness for different layouts by using a single harness board template.

Typically, about half of the manufactured MCC units utilize common design so that large quantities of harnesses are required. In these instances, stock harness boards may be provided. The other half of the MCC units are in smaller quantities and may not justify assembling and storing an individual harness board. The design of a specific harness board for small quantity MCC units is not economical and is time consuming. Also, it is desirable to use a just-in-time system to make precise harnesses by operators without advance harness board design.

The present invention is directed to solving one or more of the problems discussed above.

SUMMARY OF THE INVENTION

The present invention is directed to a reconfigurable harness board and its assembly procedures which provide a precise harness template for virtually every MCC unit design.

A harness operator can use this system and method to reconfigure the harness board quickly and manufacture a precise wire harness using the reconfigurable harness board. This increases the efficiency of both wire harness and wiring operations.

In accordance with one aspect of the invention, there is disclosed a reconfigurable harness board system for assembling a wire harness for an electrical panel comprising a plurality of sub-harness modules. Each module defines a template for a wire harness for a select electrical component for the electrical panel. Means are provided for mounting select ones of the sub-harness modules to a frame in a select orientation corresponding to layout of electrical components for the electrical panel to create a harness board for assembling a wire harness for the electrical panel.

It is a feature of the invention that each sub-harness module includes a sub-harness index identifying the select electrical component and a select position on the board.

The system may define a plurality of distinct harness boards according to selection and location of the select ones of the sub-harness modules for each distinct harness board and each distinct harness board includes a harness index identifying the harness board size and the sub-harness indices for the select ones of the sub-harness modules.

It is another feature of the invention that the frame comprises a DIN rail.

It is still another feature of the invention that the electrical panel comprises a motor control center and the select ones of the sub-harness modules comprise a pilot light sub-harness module and a terminal block sub-harness module.

It is still another feature of the invention that each sub-harness module comprises a planar substrate having a plurality of posts and wire path lines on the substrate identifying a wire length and routing relative to the posts.

There is disclosed in accordance with another aspect of the invention a method for reconfiguring a harness board used for assembling a wire harness for an electrical panel comprising providing a plurality of sub-harness modules, each module defining a template for a wire harness for a select electrical component for the electrical panel; providing a frame; selecting from the plurality of sub-harness modules according to layout of electrical components for the electrical panel; and mounting the selected sub-harness modules to the frame in a select orientation corresponding to layout of electrical components for the electrical panel to create a harness board for assembling a wire harness for the electrical panel.

Further features and advantages of the invention will be readily apparent from the specification and from the drawings.

DETAILED DESCRIPTION OF THE INVENTION

In accordance with the invention, a reconfigurable harness board system and method assists manufacture of a wire harness for an electrical panel. Wire routes are predetermined based on components and location of the components in the electrical panel and imprinted on sub-harness modules that can be selectively mounted to a frame in a select orientation corresponding to layout of electrical components for the electrical panel to create a harness board for assembling a wire harness for the electrical panel.

The reconfigurable harness board system and method in accordance with the invention are described herein in connection with an electrical panel in the form of a motor control center (MCC) unit. Such an MCC unit typically includes a terminal board, a motor starter, relays, circuit breakers and lights. Other components may also be included, as is well known. As is apparent, the particular components used in any given MCC unit can vary, as can the location of the components in the MCC unit. This system and method provides individual sub-harness modules at each location which can then be swapped as necessary according to the layout of a particular MCC unit.

The present invention is not directed to any particular MCC unit design or layout, and is not intended to be so limited. Further the reconfigurable harness board can be used for manufacturing wire harnesses for other types of electrical panels, as will be apparent.

Figure 1:
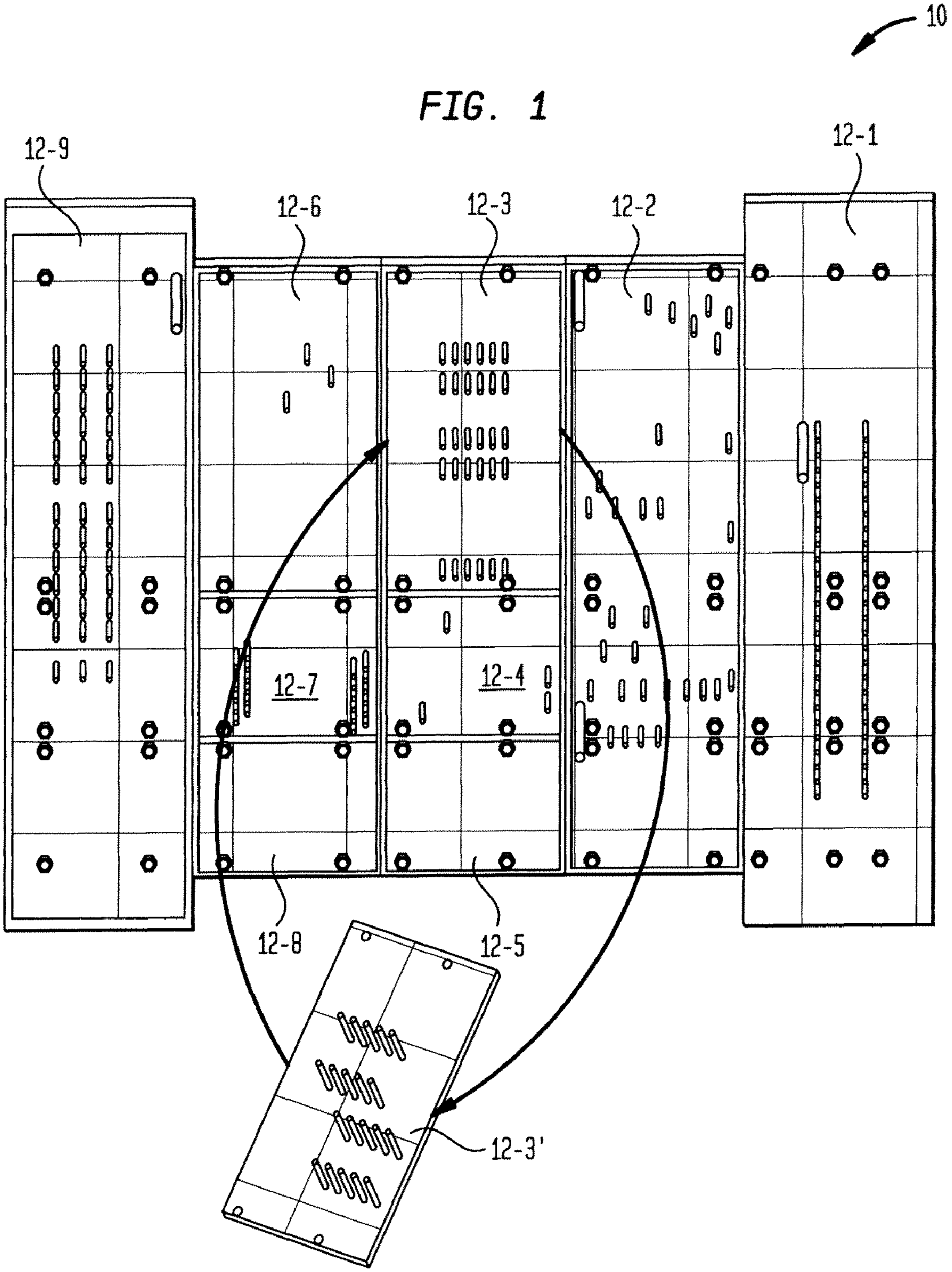
FIG. 1 is a front perspective view of a reconfigurable harness board in accordance with the invention, illustrating swapping of a sub-harness module.
Figure 2:
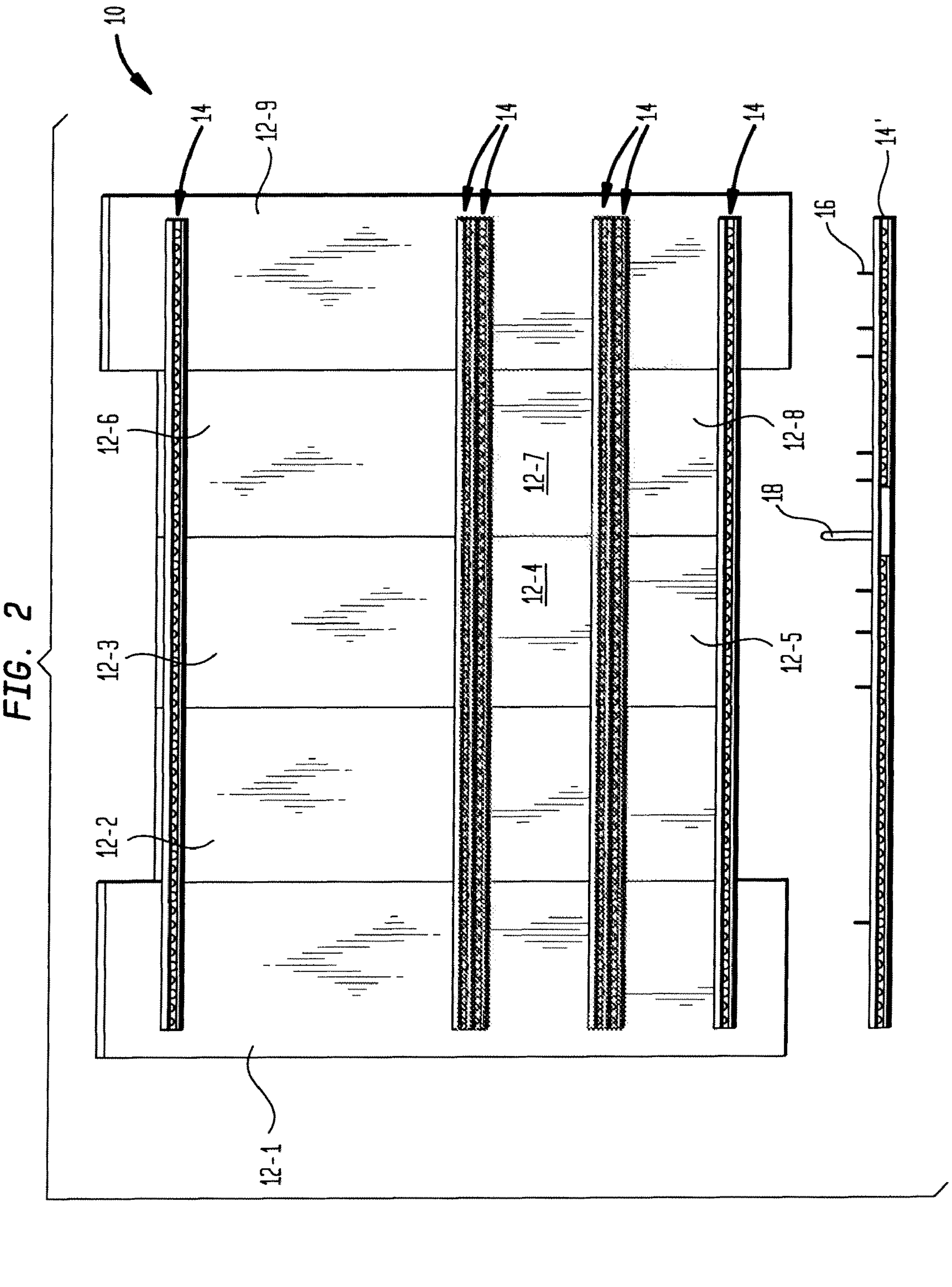
FIG. 2 is a rear perspective view of the reconfigurable wire harness board of FIG. 1.

Referring to FIGS. 1 and 2, an exemplary reconfigurable harness board 10, in accordance with the invention, includes a plurality of sub-harness modules 12. In the illustrated embodiment of the invention, there are nine sub-harness modules 12 used at nine select positions identified by the numerals 1-9 thereon. The individual modules are numbered with the prefix 12 followed by a dash and the position number. For example, 12-2 represents the module 12 at position 2. For simplicity, when the sub-harness modules are referred to generally, the numeral 12 is used without a suffix. The suffix is used when discussing a particular module. Each module 12 defines a template for a wire harness for a selected electrical component for the electrical panel. The modules 12 are mounted to a frame 14, see FIG. 2. Each module 12 represents a component at a certain position. FIG. 1 illustrates that the module 12-3 can be replaced with the module 12-3' in accordance with the invention.

Each sub-harness module 12 represents a component at a certain position. Advantageously, each module 12 is imprinted with a component symbol and schematic drawing with terminal locations shown on the board, as described below. All the modules 12 are front mounted on a DIN rail type frame 14. Particularly, a DIN rail 14', shown in FIG. 2, includes a plurality of threaded fasteners 16 or posts 18 extending therefrom. These fasteners 16 and posts 18 are received in openings, described below, in the modules 12. The modules 12 can be easily swapped based on the different configurations of an MCC unit. When a new component is introduced, only the corresponding sub-harness module 12 needs to be changed, while other sub-harness modules 12 can remain on the frame 14. The mounting frame is designed for 12", 18" and 24" height MCC units. In accordance with the illustrated embodiment of the invention, the first module 12-1 comprises a terminal block module and the ninth module 12-9 represents a pilot light module. These modules are dimensionally precise for all three side MCC units. The modules 2-8 can be reconfigured for different size MCC units.

As is apparent, the frame 14 could be formed of other components appropriate to support a plurality of sub-harness modules in a desired orientation.

Figure 3:
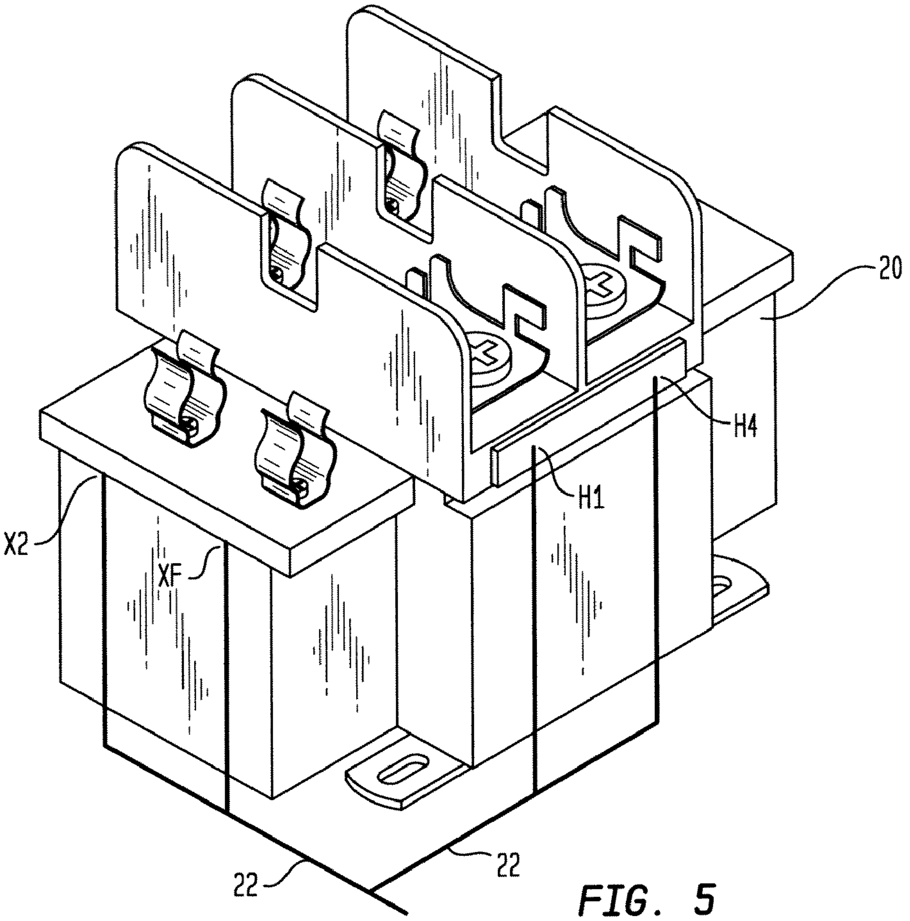
FIG. 3 is a perspective, three dimensional view, of a transformer illustrating wire routing to and from the transformer.
Figure 5:
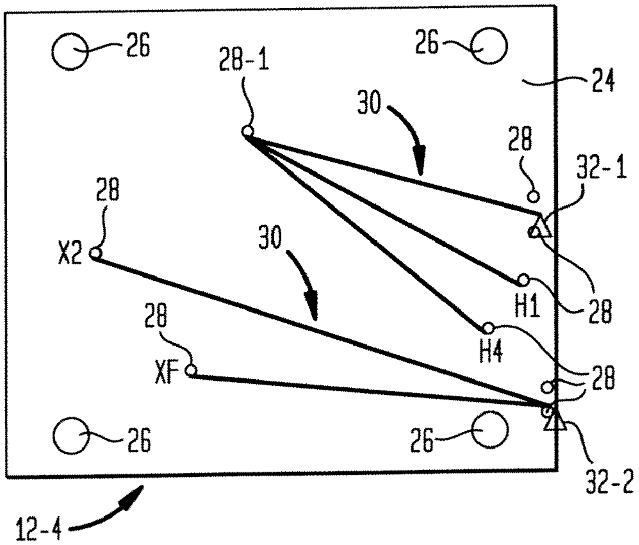
FIG. 5 is a plan view of a sub-harness module for the transformer of FIG. 3.
Figure 4:
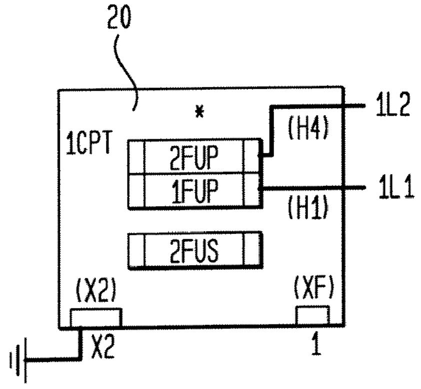
FIG. 4 is a schematic diagram of the transformer of FIG. 3.

A sub-harness template is created for each component group. The key is to transfer a three dimensional component to a two dimensional sub-harness template. This is illustrated in FIGS. 3, 4 and 5. FIG. 3 illustrates in three dimension a transformer 20 and possible wire routing between terminals X2 and XF and terminals H1 and H4. The wire routes are illustrated with lines 22. FIG. 4 schematically illustrates the transformer 20 and wiring therefor. FIG. 5 illustrates a sub-harness module 12-4, representing that used in the fourth position of FIG. 1, for the transformer 20. The module 124 comprises a planar substrate 24. The substrate 24 may be of wood construction, or the like. An opening 26 is provided at each corner of the substrates 24. Each opening 26 is used for receiving a threaded fastener 16 or post 18 of the DIN rail for mounting the module 12-4. A plurality of posts 28 extend outwardly from the substrates 24. The post 28 may be secured to the substrates 24 in any known manner, such as by nailing therein. Wire path lines 30 identifying wire length and routing relative to the post 28. The substrate 24 also includes markings for the termination points, such as X2, XF, H1 and H4 shown in FIGS. 3 and 4. A triangle symbol 32 illustrates entry point for wires on the module 12-4. Although not shown in FIG. 5, the schematic of FIG. 4 is advantageously imprinted on the face of the substrate 24.

Using the sub-harness module 12-4 of FIG. 5, four wire routes are illustrated. Two wires begin at the diamond 32-1 and extend to a post 28-1 where they are bent back to posts proximate the markers H1 and H4 where the wires terminate. Two additional wires enter at the diamond 32-2 and extend to the posts represented by the markings XF and X2 where they terminate.

As will be apparent, each sub-harness module is uniquely designed according to the corresponding electrical component. The present invention is not directed to any particular module, but rather the use of modules to create a reconfigurable harness board system and method. As such, only the exemplary module 12-4 is described in detail.

Figure 6:
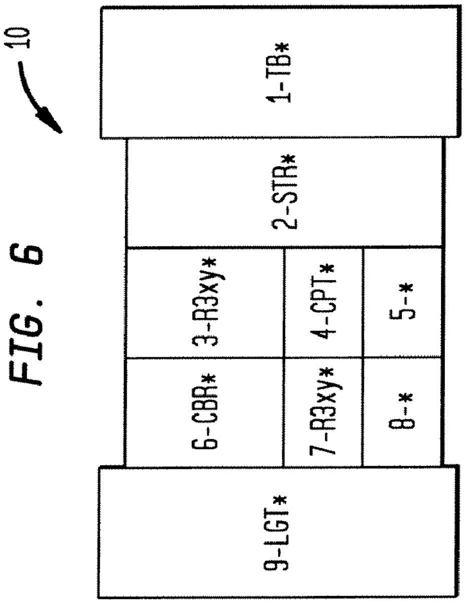
FIG. 6 is a block diagram representation of the reconfigurable harness board of FIG. 1.

The assembly procedure to create the reconfigurable harness board 10 corresponds to a particular customer order. The assembly procedure is described in connection with FIGS. 6 and 7. Each component group is assigned a sub-harness index. The first digit of the index gives the location of the sub-harness module, i.e., one of the nine positions. The characters after the dash represent the component. For example, the component indexes illustrated in the reconfigurable harness board 10 of FIG. 6 and the relevant components are as follows:

| INDEX | DESCRIPTION |
|---|---|
| 1-TB | Terminal Block |
| 2-STR | Motor Starter |
| 3-R3XY | Relay |
| 4-CPT | Transformer |
| 5- | no component |
| 6-CBR | Circuit Breaker |
| 7-RX3Y | Relay |
| 8- | no component |
| 9-LGT | Light Module |

This harness board 10 is then identified by a harness index identifying the harness board size and the sub-harness indices for the select ones of the sub-harness modules. In this example the harness index is:

12BD1-1TB-2STR-3RX3Y-4CPT-5-6CBR-7RX37-B-9LGT

As is apparent, various other indexes can be used such as for fuse blocks, timers, etc. The indices shown are by way of illustration only. The sub-harness indices help an operator to quickly assemble a unique and precise harness template for each MCC unit. The harness made from the reconfigurable harness board becomes precise, even with possible hundreds of layout combinations. A particular harness board can then be identified with a harness board number followed by the nine indices for the particular harness board.

Figure 7:
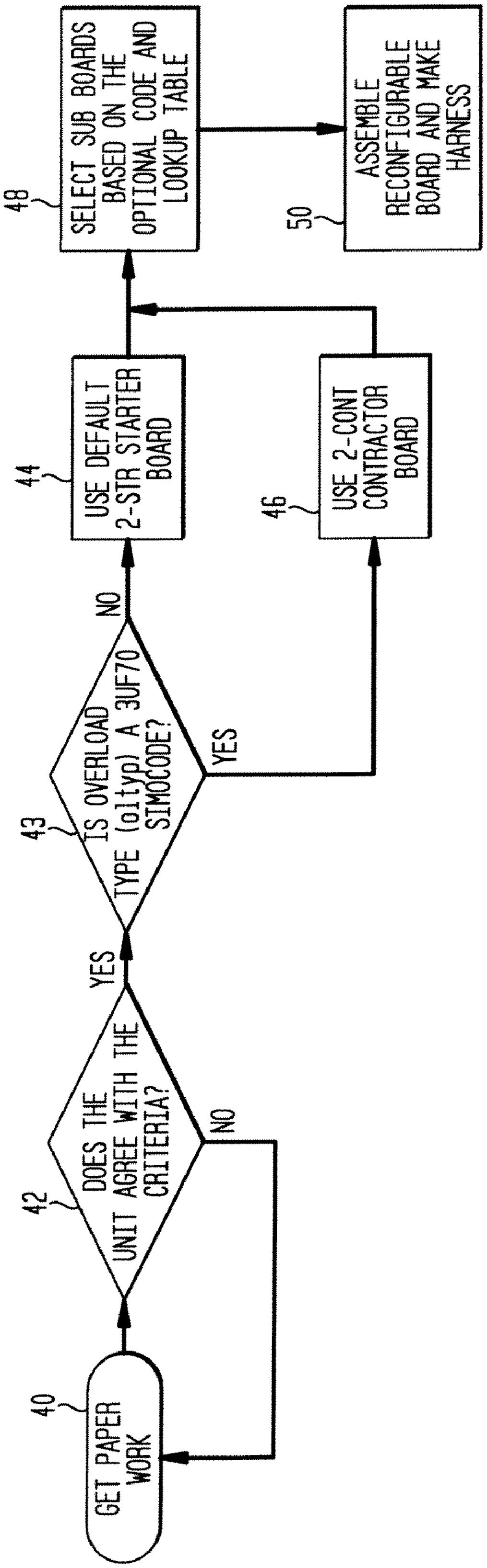
FIG. 7 is a flow diagram illustrating a method for reconfiguring a harness board in accordance with the invention.

FIG. 7 illustrates a flow diagram for a method of reconfiguring the harness board by way of example. The operator begins at a node 40 to obtain paper work for the MCC unit, such as bill of material, wiring diagrams and component listings. A decision block 42 determines if the MCC unit design agrees with the criteria in the paper work. If not, the system moves back to the node 40 until the unit does agree with the criteria. A decision block 43 determines if the overload used for the device is a particular type, identified as a 3UF7O SMICODE identifying a solid state device in this example. If not, then the system uses the default 2-STR starter module at a block 44. If so, then a 2-CONT contactor sub-harness module is used at a block 46. Thereafter, the sub-harness boards are selected based on the optional codes using a look up table at a block 48 and assembled at a block 50 in order to make a wire harness.

As is apparent, when designing the individual modules, the particular wire routing depends not only on the component thereon, but also the particular position of the component in the harness board. The entry points for wires are particularly designed according to the position of the module 12. This is because the wire entry positions of adjacent modules must necessarily match up to adjacent modules for proper routing of the wires, as will be apparent. Thus, the wire path lines on each sub-harness module 12 are selected according to the location of the module 12 in the harness board 10.

Thus, in accordance with the invention, the reconfigurable harness board system and its assembly procedure make precise harnesses just in time for MCC units or other electrical panels with different configurations. The precise wire harness and just in time procedures can greatly increase the efficiency with minimal material waste.

I claim:

1. A reconfigurable harness board system for assembling a wire harness for an electrical panel comprising:

a plurality of sub-harness modules, wherein each sub-harness module defines a swappable template for a wire harness for a respective electrical component for the electrical panel;

a frame; and means for mounting the plurality of sub-harness modules to the frame according to a first layout of electrical components for the electrical panel to create the reconfigurable harness board system, wherein each of the plurality of sub-harness modules is detachable from the frame to swap a respective sub-harness module with a different sub-harness module to reconfigure the harness board system according to a second layout of electrical components.

2. The reconfigurable harness board system of claim 1 wherein each sub-harness module includes a sub-harness index identifying an electrical component and an orientation on the harness board.

3. The reconfigurable harness board system of claim 2, wherein the reconfigurable harness board system is identified by a harness index identifying a size of the harness board and a plurality of sub-harness indices corresponding to the plurality of sub-harness modules.

4. The reconfigurable harness board system of claim 1 wherein the frame comprises a DIN rail.

5. The reconfigurable harness board system of claim 1 wherein the electrical panel comprises a motor control center and the plurality of sub-harness modules comprises a sub-harness for a pilot light and a sub-harness for a terminal block.

6. The reconfigurable harness board system of claim 1 wherein each sub-harness module comprises a planar substrate having a plurality of posts and wire path lines on the substrate identifying wire length and routing relative to the posts.

* * * * *